United States Patent Office 3,422,850
Patented Jan. 21, 1969

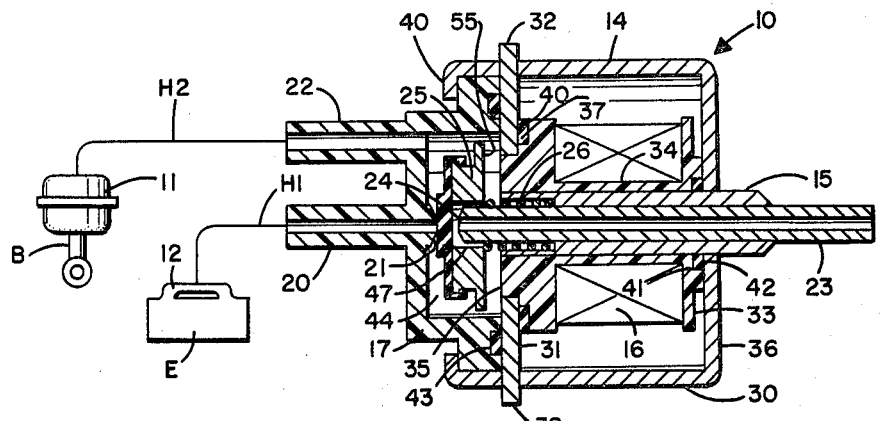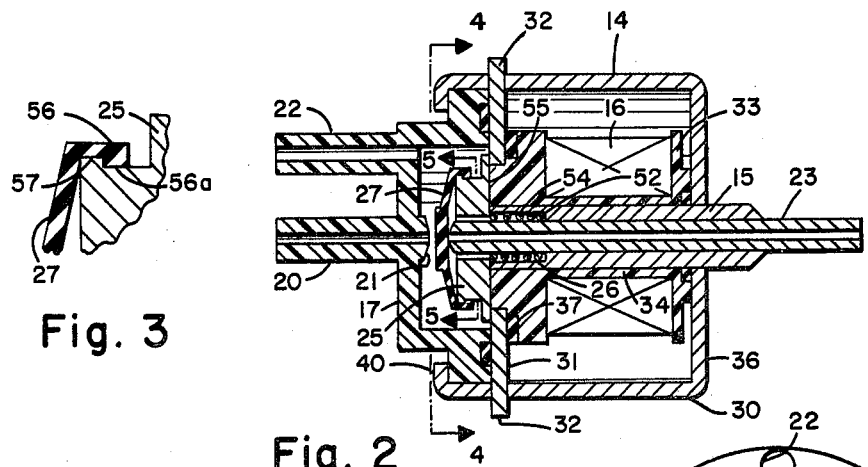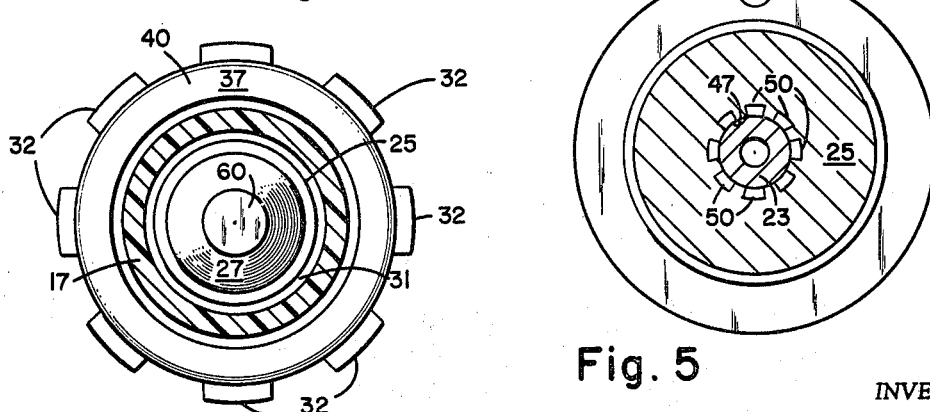

3,422,850
ELECTROMAGNETIC FLUID VALVE
Roland B. Caldwell, Worthington, Ohio, assignor to Ranco Incorporated, Franklin County, Ohio, a corporation of Ohio
Filed Dec. 15, 1966, Ser. No. 602,100
U.S. Cl. 137—625.65    4 Claims
Int. Cl. F16k *31/06, 11/02*

ABSTRACT OF THE DISCLOSURE

Ports of a three-way valve are alternatively closed by the central part of a flexible rubber cap attached to the periphery of an annular armature sliding on a tube, the end of which forms a valve seat. A solenoid and spring shifts the armature to the central part of the rubber cap to opposite valve ports.

---

The present invention relates to electromagnetically operated valves for controlling the flow of fluids.

The principal object of the invention is the provision of an inexpensive and yet highly effective electromagnetically operated valve for controlling the flow of fluids, and which can be fabricated of inexpensively made parts having wide tolerances and yet which provide effective and positive valve operation by a relatively low power solenoid.

The present invention contemplates an electromagnetic operated valve including a solenoid and an armature movable by the energization of the solenoid, the armature carrying a valve closure member in the form of a flexible or resilient web adapted to have a part thereof engage and close on a valve port and which is supported at parts thereof which are remote from the portion which engages the port so that the valve port engaging portion may flex relative to the armature to effect good seating and to permit the armature to develop inertia before the valve member is forced from the port.

The invention is particularly advantageous in use for controlling the flow of fluid through one or the other of two opposed ports as the armature may be in the form of an annular member slidable along a tube, one end of which forms one of the two valve ports, and the valve closure member may be disc-shaped and attached across one face of the armature by securing its edges to the edges of the armature with the central portion adapted to engage one or the other of the valve ports for closing the same.

Other objects and advantages of the invention will be apparent from the following description of a preferred form thereof, reference being made to the accompanying drawings wherein:

FIGS. 1 and 2 are longitudinal sectional views of a magnetically operated three-way valve embodying the invention and showing certain parts in different positions;

FIG. 3 is a fragmentary view of certain parts shown in FIGS. 1 and 2 but on a larger scale;

FIG. 4 is a sectional view taken substantially along line 4—4 of FIG. 2; and

FIG. 5 is a sectional view taken substantially along line 5—5 of FIG. 2.

Referring to the drawings, an electromagnetic three-way valve 10 is shown embodying the invention for controlling a vacuum operated servo motor 11 by alternately connecting the motor with a source of vacuum 12 or venting the motor to atmosphere. The vacuum motor 11 is of a conventional form and of the type which includes a shell having a diaphragm across the center thereof and which diaphragm is connected with an actuator member 13 which may be used to operate various devices, such as damper doors for automobile heating and cooling systems, or the like. The source of vacuum 12 may be of any suitable vacuum producing agency and in the form shown comprises the intake manifold 12 of a gasoline engine E.

The valve 10 comprises an iron frame 14 including a hollow core 15 on which a solenoid assembly 16 is supported. A valve housing 17 is hermetically attached to one end of the frame 14 and provides a chamber 18 having a vacuum connector stem 20 projecting from one wall exteriorly of the chamber and a valve port 21 is formed at the inner end of the stem and opens to the interior of the chamber. The stem 20 receives one end of a hose H1 which is connected to the intake manifold 12. An outlet stem 22 projects from the housing and forms communication with the interior of the chamber 18 and the motor 11 through a suitable hose H2. A non-magnetic tube 23 extends through the core 15 and terminates in the housing to form a valve port 24 opposite the port 21.

An annular shape armature 25 slides on the left hand end of the tube 23 and is normally urged by a spring 26 toward the port 21. The armature 25 is adapted to be drawn to the adjacent end of the solenoid 16 when the solenoid is energized, and the plane of the outer face of the armature is slightly to the right of the port 24.

A cap-shaped resilient and flexible rubber or rubber-like valve closure member 27 has its outer edges attached about the outer sides of the armature 25 and the web portion thereof extends across the outer face of the armature and opposite sides of the central portion of the member form valve surfaces which seat on one or the other of the ports 21 or 24.

Referring to the details of the valve 10, the frame 14 comprises an iron cup-shape member 30 having an iron plate 31 extending thereacross and attached thereto as by having lugs 32 project through slots in the sides of the member 30. The solenoid assembly 16 includes a spool 33 of non-magnetic material on which the solenoid is wound and which spool has a hollow hub 34 through which the core 15 extends. The core 15 is formed of an iron tube and the left hand end thereof is flush with the surface 35 of one end of the spool and the opposite end extends through a closely fitting opening through the end wall 36 of the frame member 30.

The tube 23 is of non-magnetic material and is cemented to the inside of the core 15 so that its end which forms the valve port 24, projects beyond the plane of the spool surface 35.

The valve housing 17 is preferably formed of a molded plastic and is generally cup-shaped with the open side secured to the plate 31 by the end edges 37 of the frame member 30 being rolled over an annular shoulder 40 extending radially from the housing 17. The end face of the housing 17 abutting the plate 31 has an annular groove therein which receives a rubber washer or gasket 43 which forms a fluid tight seal between the abutting surfaces.

The housing 17, wall 31 and surface 35, form a chamber 44, and the port 24 formed by the end of the tube 23 is disposed in the chamber opposite the port 21. The stem 20 connects the port 21 with the source of suction 12 by way of the flexible hose H1, and the stem 22 connects the chamber 44 with the motor 11 by way of the hose H2.

The spool 33 is undercut at 37 to form an annular groove facing the plate 31 and in which a rubber washer or gasket 40 is compressed to form a fluid seal between the plate and the adjacent end of the spool. The opposite end of the spool 33 is similarly undercut as at 41 to form a groove facing the end wall 36 of the frame member 30 and an annular rubber washer 42 is disposed in the undercut portion to form a fluid-tight seal between the frame wall 36, the spool, and the core 20.

The armature 25 is disc-shaped and has a central opening 47 which receives the end portion of the tube 23 therethrough and is adapted to loosely slide thereon. The walls of opening 47 have axially extending grooves 50 therein which form passage for fluid to pass from the chamber 44 through the tube 23 to atmosphere. The armature 25 is urged from the adjacent end of the solenoid by the compression spring 26 which is positioned in an annular recess between the outside of the tube 23 and the inner surface of an under-cut portion 54 of the core 15.

The face 55 of the armature 25 is of such diameter that it bridges the adjacent end of the core 15 and the plate 31 so that the armature may complete the flux path through the core and the frame members 31, 30, and when the solenoid 16 is energized the armature 25 will be drawn to the position shown in FIG. 2.

The solenoid 16 may be energized in any suitable manner, not shown, as it is unnecessary to the understanding of the invention.

The valve closure member 27 is in the form of a circular web having a radially extending peripheral flange 56, the outer edge of which has a lip 56a. The flange 56 extends about the sides of the armature which are undercut to form an annular flange 57 which is engaged by the lip 56a to secure the flange to the armature by a fluid-tight connection. The central portion of the member 27 is thickened at 60 to form a valve closure pad which alternately engages ports 21 and 24 when the solenoid 16 is deenergized and energized, respectively. It will be noted that the central portion of the valve member 27 may move relative to the armature 25 because of the ready flexure of the web area between the central valve pad 60 and the rim of the valve member. Thus, when the pad 60 is closed on port 21 and the solenoid 16 is energized, the initial movement of the armature 25 toward the solenoid may be made with relatively small force due to the flexible nature of the valve member 27. As the armature nears the frame members 15, 31 the magnetic force acting thereon increases considerably and an appreciable force is available from the inertia of the armature to shift the pad 60 from the suction port 21. By this construction, a relatively low powered solenoid can be employed to control the port closure member.

It will also be appreciated that the form of the valve member 27, both as to shape and composition, permits it to conform to the valve port surfaces and provide a positive closing of the valve ports 21, 24 without precise alignment of the valve member and the valve ports on which it closes. Thus, the fabrication and assembly of the valve mechanism can be relatively inexpensive and yet a highly satisfactorily operating valve is provided.

Although but one form of the invention has been shown, it is to be understood that other forms, modifications and adaptations could be made all falling within the scope of the claims which follow.

I claim:

1. A solenoid operated valve comprising a valve port forming a valve seat, an iron solenoid frame associated with said port, a solenoid supported on said frame, an armature normally urged to one position and adapted to be moved to a second position by the energization of said solenoid, characterized by said armature having a face opposite the plane of said valve seat, and a valve member comprising a relatively flexible web portion extending across said face and said web portion adapted to engage and cover said valve seat when said armature is in one of its positions, and means attaching said valve member to said armature at points radially outwardly from the axis of said valve seat whereby said armature may initiate movement away from said seat while said web portion remains on said seat.

2. A solenoid operated valve as defined in claim 1 characterized by said armature having an annular face opposite said valve seat and said valve member comprising a circular resilient membrane member attached to said armature solely about the outer circular edge of said face and adapted to flex and move axially relative to said face of said armature.

3. A solenoid operated valve comprising an iron frame for a solenoid including a tubular core, a solenoid in said frame and surrounding said core, a tubular member projecting from said core beyond one end of said solenoid and having the projected end forming a valve seat, an annular armature disposed about said tubular member and adapted to be moved toward and from said solenoid, and a web-like flexible valve closure member extending across the end of said armature remote from said solenoid and adapted to engage said seat when said armature is moved toward said solenoid, and means attaching parts of said valve member to said armature solely at points spaced radially outwardly about the opening through said armature to thereby permit flexing of the portion of said valve member extending across said opening in said armature relative to the surface of said end of said armature.

4. A solenoid operated valve comprising a cup-shape iron frame member, an iron plate extending transversely of said frame member and normal to the axis thereof, a solenoid assembly in said frame member including a spool axially disposed relative to said frame member and including a hollow hub, a hollow iron core extending through said hub and terminating with one end substantially in the plane of the outer surface of said plate, a non-magnetic tube extending through said core and having one end portion projecting beyond said plate and forming a valve seat, a valve housing having a recess in one end thereof, means attaching said housing to said frame with said recess facing said plate, said housing having a valve port in an end wall of said recess and forming a second valve seat disposed in axial alignment with said tube and spaced from said first valve seat, an annular armature slidingly supported on said end portion of said tube and adapted to be magnetically attracted to said plate when said solenoid is energized, a cap of rubber-like material having a circular flange embracing the periphery of said armature and having an impervious web-like portion extending across the end face of said armature remote from said solenoid, the depth of said armature being greater than said projecting end of said tube and the distance between said first and second valve seats exceeding the thickness of said cap, whereby when said armature is attracted to said solenoid, said web-like portion of said cap engages and covers said first valve seat and when said armature is moved from said solenoid said web-like portion of said cap engages and covers said second valve seat, and means including a compression spring surrounding a portion of said tube and engaging said armature for biasing said armature from said solenoid.

References Cited

UNITED STATES PATENTS

| | | | |
|---|---|---|---|
| 1,914,123 | 6/1933 | Hapgood | 251—139 XR |
| 2,553,940 | 5/1951 | Quartullo | 137—596.17 XR |
| 2,842,400 | 7/1958 | Booth et al. | 251—138 XR |
| 2,860,850 | 11/1958 | Rhodes et al. | 251—139 |
| 2,914,034 | 11/1959 | Becker | 137—625.65 |
| 2,931,619 | 4/1960 | Anderson | 251—139 |
| 3,073,345 | 1/1963 | Hagler | 137—625.65 |

HENRY T. KLINKSIEK, *Primary Examiner.*

U.S. Cl. X.R.

251—129, 331